United States Patent [19]

Gibbon

[11] Patent Number: 5,446,075
[45] Date of Patent: Aug. 29, 1995

[54] MONITOR PUTTY

[75] Inventor: Robert M. Gibbon, Fort Worth, Tex.

[73] Assignee: JMK International, Inc., Weatherford, Tex.

[21] Appl. No.: 376,629

[22] Filed: Jan. 23, 1995

Related U.S. Application Data

[63] Continuation of Ser. No. 111,689, Aug. 25, 1993, abandoned, which is a continuation-in-part of Ser. No. 41,081, Apr. 1, 1993, abandoned.

[51] Int. Cl.[6] .............................. G21F 1/10
[52] U.S. Cl. .................. 523/137; 524/322; 524/588
[58] Field of Search .............. 524/322, 588; 523/137

[56] References Cited

U.S. PATENT DOCUMENTS

| | | | |
|---|---|---|---|
| 2,541,851 | 2/1951 | Wright | 260/37 |
| 2,644,805 | 7/1953 | Martin | 260/46.5 |
| 2,852,484 | 9/1958 | Norman | 260/33.4 |
| 3,677,997 | 7/1972 | Kaiser et al. | 260/332 SB |
| 3,855,171 | 12/1974 | Wegehaupt et al. | 528/10 |
| 3,862,919 | 1/1975 | Nitzche et al. | 260/18 S |
| 4,011,197 | 3/1977 | Lee | 260/46.5 UA |
| 4,026,844 | 5/1977 | Kittle et al. | 260/2.5 S |
| 4,040,619 | 8/1977 | Landi | 272/68 |
| 4,145,359 | 3/1979 | Homan et al. | 260/448.2 N |
| 4,208,316 | 6/1980 | Nauroth et al. | 260/37 SB |
| 4,273,589 | 6/1981 | Nauroth et al. | 106/308 Q |
| 4,292,087 | 9/1981 | Bell | 106/193 M |
| 4,308,074 | 12/1981 | Nauroth et al. | 106/308 |
| 4,395,526 | 7/1983 | White et al. | 528/18 |
| 4,417,042 | 11/1983 | Dziark | 528/18 |
| 4,463,108 | 7/1984 | Wagner et al. | 523/216 |
| 4,731,294 | 3/1988 | Pouchol et al. | 428/447 |
| 4,929,691 | 5/1990 | FIllmore et al. | 525/477 |
| 4,929,703 | 5/1990 | Narula et al. | 528/23 |
| 5,024,863 | 6/1991 | Gibbon | 427/387 |
| 5,028,653 | 7/1991 | Desmenceau et al. | 524/462 |
| 5,039,771 | 8/1991 | Morimoto et al. | 528/14 |
| 5,063,012 | 11/1991 | Gibbon | 264/129 |
| 5,319,021 | 6/1994 | Christy | 524/857 |

FOREIGN PATENT DOCUMENTS 1004893  9/1965  United Kingdom .

Primary Examiner—Melvyn I. Marquis
Assistant Examiner—Karen A. Dean
Attorney, Agent, or Firm—Jefferson Perkins

[57] ABSTRACT

Apparatus (10) for providing manipulative physical therapy includes a first mass (14) of a putty including a reaction product of siloxane with a boron- or tin-containing compound and a normal polysiloxane. At least one additional mass (18-32) of the putty is provided to the patient, the additional mass adaptable to be manually combined by the patient with the first mass (14) until a uniform color is achieved in the combined mass (38). Preferably, a plurality of additional masses (18-32) having a variety of colors are provided for successive combination with the combined mass. The apparatus provides a means by which the progress of manipulative physical therapy may be monitored, as a uniform color in the combined mass will be achieved only after extensive manipulation.

15 Claims, 1 Drawing Sheet

MONITOR PUTTY

RELATED APPLICATION

This application is a continuation of application Ser. No. 08/111,689 filed Aug. 25, 1993, now abandoned, which is a continuation-in-part of application Ser. No. 08/041,081 filed Apr. 1, 1993, now abandoned, and assigned to JMK International, Inc., the assignee hereof.

TECHNICAL FIELD OF THE INVENTION

The present invention relates in general to therapeutic exercise putties and more particularly to a method and apparatus for monitoring a patient's progress in manipulative therapy using exercise putty.

BACKGROUND OF THE INVENTION

Borosiloxanes exhibit peculiar physical characteristics which make them suitable for therapeutic use. Borosiloxane bouncing putties are shown, for example, in U.S. Pat. No. 2,541,851, issued to Wright, and U.S. Pat. No. 3,677,997, issued to Kaiser et al. Both of these patents are fully incorporated by reference herein.

These bouncing putties have the peculiar characteristic of being able to be kneaded and worked as a putty-like material, while at the same time exhibiting elastic properties under a greater degree of force. A borosiloxane bouncing putty has long been commercially available as a toy under the trademark "SILLY PUTTY". Because of their characteristics, bouncing putties have found application in physical therapy to strengthen muscular control and performance of, e.g., patients'-hands.

Because a lump of exercise putty is by its nature a shapeless mass, there is no easy way for a physical therapist (or the patient) to monitor the progress being made in manipulating the putty. Different amounts of kneading or manipulation will, in conventional exercise putties, create the same result—the same shapeless mass. There is no good way to measure the amount of manipulation which has been done. A need therefore exists for a method and apparatus to monitor the progress made by a patient in exercising his or her hands.

SUMMARY OF THE INVENTION

According to one aspect of the present invention, a method of manipulative therapy is disclosed by which a first malleable mass having a first color is supplied to a patient. A second malleable mass having a second color different from the first color is also supplied to the patient, and the patient is directed to knead or manipulate the two putties together. The putty is kneaded or manipulated until such time as the two colors are completely blended together to yield a uniform color which is a result of blending the first color with the second color.

According to a further aspect of the invention, the malleable masses provided to the patient are based on borosiloxane and are pigmented to different colors.

According to another aspect of the invention, the second malleable mass is significantly smaller and has a more concentrated color than the first malleable mass. Once this second malleable mass has been completely combined with a first malleable mass, further highly colored malleable masses are provided to the patient for combination with the product of the last combination. This process is repeated a number of times suitable for the patient'therapy or until such time as the combined mass has achieved a color which can no longer be altered by additional amounts of putty, such as a uniform dark brown color. It is preferred that apparatus according to the invention be provided to physical therapists and the alike in a kit including a relatively large mass of relatively colorless exercise putty, and a plurality of relatively small masses of putty having distinctive colors, and each being chromatically distinct from at least one other small mass. In this way, the combined putty mass will change color as additional amounts of small, highly colored putty of varying hues are added to it.

The present invention confers a technical advantage in that the progress of the patient's manipulative therapy can be closely monitored. If a large, relatively uncolored mass of putty is poorly combined with a smaller, highly colored mass, the two masses will simply be lumped together and will be visually distinct from one another. At an intermediate stage, the masses will have been blended together such that stripes of color will appear in the combined mass. Only after a considerable amount of kneading and manipulating will the mass attain a uniform color which is the product of combining the colors in the original two constituents. This provides the physiotherapist or physician some indication of the amount of working being done by the patient, allowing the therapist or physician to monitor the patient'progress.

BRIEF DESCRIPTION OF THE DRAWINGS

Further aspects of the invention and their advantages will be discerned with reference to the following detailed description in conjunction with the drawings, in which.

DETAILED DESCRIPTION OF THE INVENTION

Figure 1:
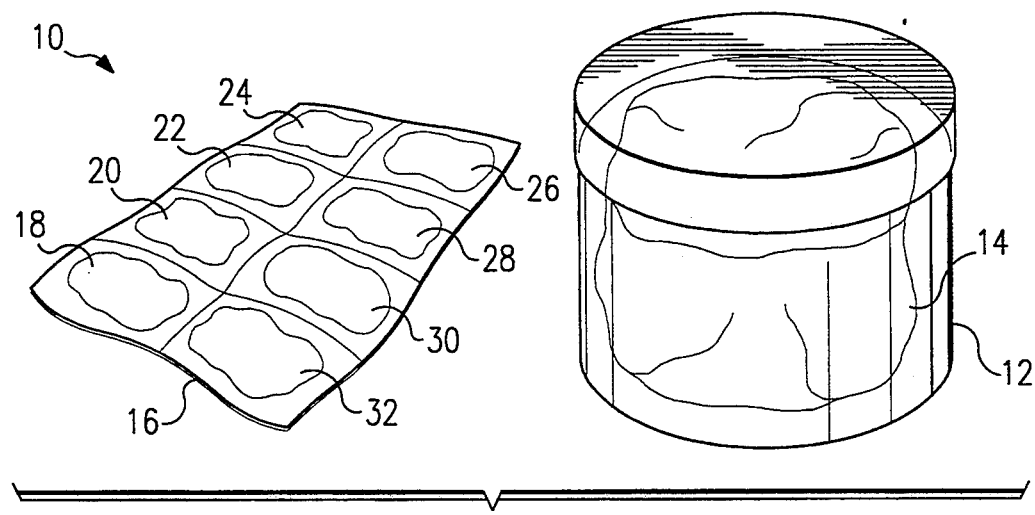
FIG. 1 is an isometric view of the principal components of an exercise putty kit for manipulative therapy.

Any of numerous malleable materials may provide the base for the colored exercise putties according to the invention, such as clays. However, siloxanes and siloxane reaction products are preferred because they will not dry out as water-based compositions will have a tendency to do. Particularly preferred exercise putties according to the present invention include (a) a chain-extended polysiloxane reaction product, (b) optionally a second, normal polysiloxane gum, (c) an internal lubricant such as a monounsaturated fatty acid, (d) any of a number of filler materials, and (e) in the instance of any of the originally colored masses of exercise putty described below, a small amount of pigment.

The chain-extended polysiloxane reaction product is formed by reacting a polydiorganosiloxane with a reactant containing oxygen and either boron or tin. Such reactants can be any of several boron and oxygen containing reactants, such as trimethyl boroxane, pyroboric acid, boric anhydride, ethyl borate, esters of boric acid, etc. Where boron is selected as the chain-extending atom, trimethyl boroxine is a preferred reactant. The reactant may also be a tin- and oxygen-containing compound such as dibutyldiacetoxytin.

This reactant is reacted with a polydiorganosiloxane that preferably is a hydroxyl end-stopped polydimethylsiloxane fluid having a viscosity of 50,000–100,000 centistokes, a weight average molecular weight of 88,000–103,000, and an average number of siloxyl units per molecule in the range of 1,200–1,400. The reactant attacks the hydroxyl groups on the ends of the polysiloxane chain to yield chain extension through the boron or tin groups. Where boron is used as the chain-extending atom, and because boron is trifunctional, the boron atom will link three polysiloxane chain ends together about fifty to one hundred percent of the time.

In a particularly preferred composition, approximately 100 parts by weight of the above hydroxyl end stopped polydimethylsiloxane are reacted with approximately 3 parts by weight of trimethyl boroxine. The reaction is carried out at approximately 200° F. to produce a borosiloxane reaction product.

The composition preferably further includes a normal polysiloxane gum having a viscosity on the order of 1,000,000 centistokes and a Williams' plasticity between 120 and 140 mm, inclusive. This second polysiloxane may be any common polydiorganosiloxane gum. While a particularly preferred second polysiloxane is polydimethylsiloxane, the percentage of side group substitutions is largely irrelevant, as the end composition is not to be cured and little or no siloxyl crosslinking will occur. Thus, a methyl vinyl polysiloxane can as easily be used. This second polysiloxane may be trimethyl end-blocked, dimethyl vinyl end-blocked, or end blocked with other groups known in the art. The second polysiloxane is added as a plasticizer to prevent the composition from becoming tacky after extensive kneading, and may be present in the composition in the range of 10 to 50 parts by weight inclusive relative to 100 parts by weight of the chain-extended polysiloxane reaction product.

Further, exercise putty which is based on nothing except borosiloxane is self-leveling and has a tendency to pool. This material cannot be left for long on carpeting or macroscopically porous surfaces as it will infiltrate the cracks and holes. Adding the second polysiloxane has the additional effect of providing some body or resistance to this self-leveling effect, such that the resulting mass will be more shape-retaining or clay-like and less fluid-like.

A third constituent of the composition is an internal lubricant such as 9-octadecenoic acid, sold commercially under the trademark PAMOLYN 125 oleic acid by Hercules Incorporated of Wilmington, Del. Other monounsaturated fatty acids such as those of $C_{17}-C_{18}$ carbon chain length can be used. The monounsaturated fatty acid is added to affect the flow properties of the two blended polymers described above and may be present in the end composition at 0.2–2.0 parts by weight per 100 parts of the chain-extended polysiloxane reaction product.

A fourth principal constituent is a filler material such as a siliceous or calcareous material. Particular fillers useful for the invention include fumed silica, precipitated silica, celite, ground quartz and others commonly known in the industry. The filler materials selected should not be so highly colored as to affect the desired color of the putty mass in question; on the other hand, certain highly colored fillers such as iron oxide and titanium dioxide may be intentionally used in place of the pigments disclosed below to impart particular colors to the mass. The filler material can be present in the composition from 5 to 45 parts by weight relative to 100 parts of the reaction product.

In certain applications, it may be further desired to heat the exercise putty mass prior to giving it to the patient. Certain filler materials will heat up when subjected to microwave radiation. Filler materials which are compounds and complexes containing bound water, such as hydrated silicas, have this characteristic. Representative of such compounds and complexes is precipitated silica, which is also particularly preferred because of its reinforcing capabilities. Precipitated silica has hydrated onto its surface a layer of water molecules. The water molecules themselves have OH bonds which absorb microwave energy; the silica particles heat upon exposure to this energy. Hydrated silicates and other compounds containing bound water are preferred over other water-containing mixtures because bound-water particulate materials will heat up each time after successive exposures to microwave energy. Precipitated silica acquires its boundary layers of water by the process of its manufacture. Precipitated silica is also a preferred filler constituent in that it does not rub off on the hands as carbon black, metals and the various metal oxides have a tendency to do. This is because precipitated silica is wetted by the silicone gum and therefore is retained within the composition. Further, precipitated silica is preferred because it does not mask pigments.

Other lubricants may be added to the composition in addition to, and not in place of, the monounsaturated fatty acid. One of these additional additives is petrolatum, which has the particular effect of imparting an anti-sticking property to the composition. Petrolatum may be present in the composition in an amount in the range of 0 to 30 parts by weight relative to 100 parts by weight of the boro- or stannosiloxane reaction product. Glycerine may also be added in the range of 0 to 1 part by weight order to impart a shiny surface to the product.

In order to form a particularly preferred composition, 100 parts by weight of a hydroxyl end-stopped polydimethylsiloxane having a viscosity of 70,000 centistokes is reacted with 3 parts by weight of trimethoxyboroxine at 200° F. until a "snow" of polymerized borosiloxane reaction product results. 100 parts of this reaction product is combined with 30 parts polydimethylsiloxane gum have a Williams' plasticity of 130 mm, 1 part 9-octadecenyl acid, and 20 parts precipitated silica.

For each of the colored masses initially provided according to the invention (but not the large colorless mass 14 in the embodiment illustrated in FIG. 1), a pigment is also made a portion of the composition. The color, concentration and chemical identity of these pigments is influenced by the order in which the colored masses of which they are constituents are to be combined with the main (initially colorless) mass. The first or earlier colored masses should have pigments which are weak either because they are in a low concentration or because they have a low pigmenting power, such that, when they are combined with the main mass, these pigments will not hide the further addition of stronger pigments. Pigments suitable for use with the invention should be FDA approved, of relatively low cost, and colorfast to ultraviolet light. Preferably, they are not soluble in silicone oil, because if they are they will have a tendency to come out of the putty onto the patient' hands. The pigment concentrations according to the invention are arbitrary but should be low in the first of a series of colored masses and, assuming similar coloring ability among the pigments, increase in later colored masses. Pigment concentrations in each of the colored masses may, for example, range from $1 \times 10^{-5}$ parts by weight per 100 parts of the borosiloxane reaction product to $1 \times 10^{-3}$ parts therein. Pigments found particularly useful for the invention are noted below with parts by weight relative to 100 parts of the borosiloxane reaction product in a preferred series of compositions:

1. Sky blue: 0.0008 parts titanium dioxide and 0.0004 parts ultramarine blue.
2. Yellow: 0.000018 parts chrome yellow.
3. Red: 0.0001 part Cl red 30 aluminum lake pigment.
4. White: 0.0008 parts titanium dioxide.

The smaller masses may be borosiloxane putty, polydiorganosiloxane putty, or mixtures thereof, with the amount of pigments added thereto being about the same regardless of which of the bases is selected.

The present invention is preferably provided in a kit, the parts of which are illustrated in FIG. 1. In FIG. 1, a therapeutic kit 10 according to the invention includes a container 12 of a large mass 14 of borosiloxane putty, and a package 16 containing a plurality of pockets containing respective small, colored masses 18–32 of borosiloxane or siloxane putty. The large mass may, for example, be about 50 grams and each of the small masses 18–32 can be approximately 1 gram. The large mass 14 is preferably a colorless borosiloxane-based composition as described above; in its natural, uncolored state, the mass 14 will have a whitish, translucent appearance. Each of the smaller masses 18–32, however, are highly colored, and at least some of the colored masses 18–32 should have colors which are different from the remaining ones of masses 18–32. For example, mass 18 may be sky blue, mass 20 may be yellow, mass 22 may be red, mass 24 may be yellow again, mass 26 may be green, mass 28 may be a different shade of red, mass 30 may be white, and mass 32 may be dark blue. The sequence and hues of colors within the colored masses 18–32 are largely arbitrary. The choice and concentration of the colors should be chosen accordingly to two guiding principles: first, the beginning colored masses, such as mass 18, should be less highly colored, and the ending colored masses such as mass 32 should be more highly colored. Second, the chosen colors should be sufficiently different from each other such that streaks and the like will be quickly apparent to the physical therapist. At a minimum, the colors should alternate; for example, masses 18, 22, 26 and 30 may be colored blue and masses 20, 24, 28 and 32 white. Other preferably bright colors may be added to the ones chosen for masses 18–32 according to design choice.

Figure 2A:
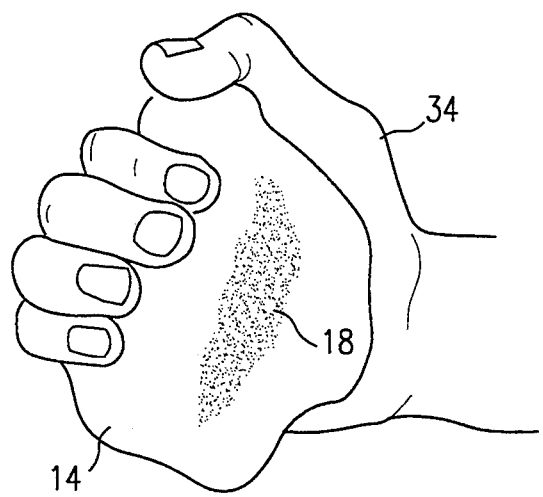
FIGS. 2a–2c are isometric views of exercise putty being manipulated by the hand of a patient, showing progressive stages in the blending of different colors according to the invention.
Figure 2B:
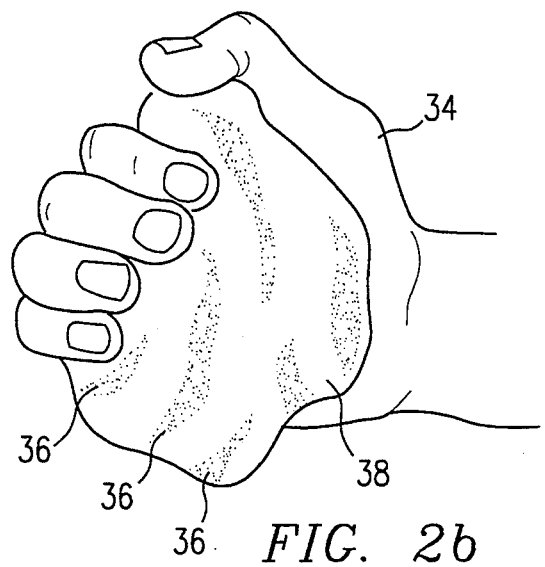
Figure 2C:
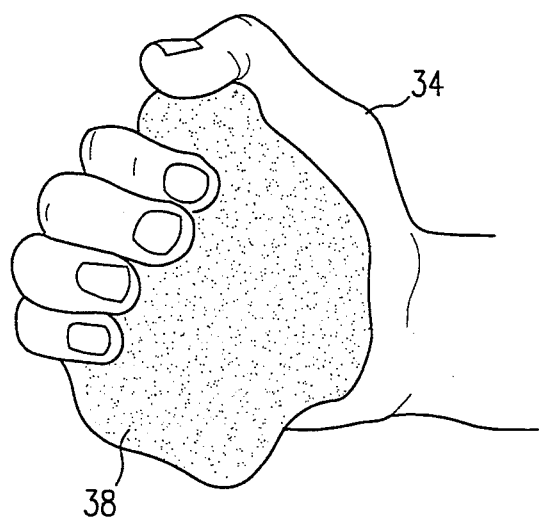

The kneading or manipulative process according to the invention is shown in FIGS. 2a–2c. In FIG. 2a, the main colorless mass 14 is shown being kneaded or manipulated by a patient's hand 34. At this stage, the physical therapist or physician has just given the patient a small colored mass 18, which is still intact and visually distinct within the combined mass. If on his or her next meeting with the patient, the physical therapist or physician discovered that the exercise putty was in this condition, the therapist or physician would know that not very much exercise or manipulation had been performed by the patient.

In FIG. 2b, an intermediate condition is shown, wherein streaks 36 of color are beginning to spread themselves throughout the combined putty mass 38. This streaking process will start with relatively large streaks having greatly contrasting color characteristics; as the kneading or manipulation process continues, the streaks will be finer and will have less contrast as compared with the background color of the combined mass 38.

In FIG. 2c, the combined mass 38 has taken on a uniform color which results from the combination of the background color of the beginning mass (in this case, the beginning mass 14) and colored mass. In this first iteration, the combined putty 38 would take on a uniform blue color where mass 18 starts out as blue. In this condition, the physical therapist would know that the putty had been manipulated or kneaded to a great extent.

The patient may periodically be given further colors from the package 16 and instructed to repeat the process. For example, the blue putty which is the result of a manipulation process in a first period (such as a first day or week) is taken; the patient is instructed to add packet 20 to it, which for example may be 1.5 grams of yellow. Yellow streaks 36 (FIG. 2b) will appear, but on continued flexing the streaks will disappear and a uniform blue/green color will be obtained as is shown in FIG. 2c.

Then, on day (or week) three, the blue/green combined mass will be combined by the patient with a third highly colored putty 22. The putty mass 22 may, for example, be 1 gram of red putty. The complete kneading and manipulation of this putty with the combined mass will produce a combined mass which is of a uniform light brown color.

This process may be repeated indefinitely with one or more packages 16 of the putty until the combined mass is of a dark uniform color whose color can no longer be easily changed by the addition of further pigment.

In an alternative embodiment, only two colors are used. With just two colors, the physical therapist supplies blue putty to the patient on day (or week) one, white putty to the patient on day (or week) two, blue putty on day (or week) three, et cetera. During each period, streaks in incompletely worked putty may be observed, either white streaks in blue or blue streaks in the white/blue blends. This process would continue until the putty is too dark to show streaks.

Once the putty has become so highly pigmented that color streaks are hard to see, it can be discarded and the therapy terminated or further exercise putty substituted in its place.

In an alternative embodiment, the different colors of the colored putty masses may denote increasing stiffness. The amount of the colored putty would be made more nearly equal to the mass of the colorless putty 14 in this embodiment, and the pigment concentration would be commensurately reduced. In this method, the patient would combine a colored putty of relatively low strength or stiffness with the colorless putty in a first period. In a next period, a portion of the first combined mass may be kneaded and manipulated by the patient with a second colored mass which is stiffer than the first.

In summary, a novel exercise putty system and method have been disclosed in which a patient's progress may be easily observed by a physical therapist or physician by the combination of different colored exercise putties.

While the detailed description has illustrated and described preferred embodiments, the present invention is not limited thereto but only by the scope and spirit of the appended claims.

We claim:

1. Apparatus for providing manipulative physical therapy to a patient, comprising:
   a first mass of putty including a reaction product of a polysiloxane and either a boron- or a tin-containing compound and having a first color, and further including an unreacted, uncured second polydiorganosiloxane gum; and
   at least one additional mass of putty including (a) a reaction product of polysiloxane and either a boron- or tin-containing compound, (b) an unreacted, uncured polydiorganosiloxane gum, or (c) mixtures of (a) and (b), said additional mass having a second color distinct from the first color, the additional mass adaptable to be manually combined by the patient with the first mass to form a combined mass having a uniform color which is a result of blending the first color and the second colors.

2. The apparatus of claim 1, wherein the additional mass is significantly smaller and more highly colored than the first mass.

3. The apparatus of claim 1, and further comprising a plurality of additional masses having colors distinct from the first color, at least some of the colors of the additional masses being distinct from each other, a first additional mass adaptable to be combined with said first mass to form a combined mass, remaining additional masses adapted to be successively manually added to the combined mass, respective uniform colors being achieved after the complete blending of each additional mass with the combined mass.

4. The apparatus of claim 1, wherein said first mass comprises:
   100 parts by weight of a chain-extended polysiloxane reaction product formed by reacting a polysiloxane having a viscosity of 50,000 to 100,000 centistokes with a reactant containing oxygen and either boron or tin;
   10 to 50 parts by weight of an unreacted, uncured second polysiloxane gum having a Williams' plasticity in the range of 120 to 140 mm;
   0.2 to 2.0 parts of an internal lubricant; and
   5 to 45 parts by weight of a particulate filler material.

5. The apparatus of claim 4, wherein said chain-extended siloxane reaction product is selected from the group consisting of borosiloxane and stannosiloxane.

6. The apparatus of claim 5, wherein said reactant is dibutyldiacetoxytin.

7. The apparatus of claim 5, wherein said reactant is trimethyl boroxine.

8. The apparatus of claim 4, wherein said particulate material is precipitated silica.

9. A method of manipulative therapy, comprising the steps of:
   supplying to a patient a first malleable mass of putty comprising (a) a chain-extending reaction product of polydiorganosiloxane and a compound containing boron or tin, and (b) an unreacted, uncured second polydiorganosiloxane gum, said first mass having a first color;
   supplying to the patient a second malleable mass of putty having a second color different from the first color, the second malleable mass being blendable into the first mass;
   directing the patient to combine the first mass with the second mass to form a combined mass having a uniform color which is a result of blending the first color with the second color, the uniform color of the combined mass indicating that the patient has manipulated the combined mass by a predetermined amount.

10. The method of claim 9, wherein the second malleable mass is significantly smaller and has a more concentrated color than the first malleable mass.

11. The method of claim 9, and further comprising the step of inspecting the combined mass for streaks, the presence of streaks indicating that the combined mass has been manipulated by less than a predetermined amount.

12. The method of claim 9, wherein the first malleable mass is a putty including borosiloxane.

13. The method of claim 9, wherein the second malleable mass is a putty including a polymer constituent selected from the group consisting of borosiloxane, a polydiorganosiloxane gum and mixtures thereof.

14. The method of claim 9, and further comprising the steps of:
   after a uniform color has been achieved in the combined mass, supplying to the patient a third malleable mass having a third color which is different from the uniform color of the combined mass;
   directing the patient to manually combine the third mass with the combined mass to form a second combined mass having a second uniform color which is a result of blending the third color with the uniform color, the achievement of the second uniform color of the second combined mass indicating that the patient has again manipulated the combined mass by a predetermined amount.

15. The method of claim 14, and further comprising:
   for a predetermined number of iterations, performing the following steps:
   after a uniform color has again been achieved in the combined mass, supplying to the patient a further malleable mass having a color different from the uniform color; and
   directing the patient to manually combine the further malleable mass with the combined mass until a uniform color is again achieved.

* * * * *